A. BECK.
AUTOMATIC SPRING CONTROLLED LIFT VALVE.
APPLICATION FILED SEPT. 30, 1907.

921,348. Patented May 11, 1909.

Witnesses:
Emil Kayser
Arthur Scholz

Inventor
Adolf Beck.
by Robert Deiffler
Attorney

UNITED STATES PATENT OFFICE.

ADOLF BECK, OF CANNSTADT, GERMANY.

AUTOMATIC SPRING-CONTROLLED LIFT-VALVE.

No. 921,348.　　　　　Specification of Letters Patent.　　　Patented May 11, 1909.

Application filed September 30, 1907. Serial No. 395,155.

*To all whom it may concern:*

Be it known that I, ADOLF BECK, a subject of the King of Würtemberg, and resident of Cannstadt, in the Kingdom of Würtemberg, German Empire, have invented a new and useful Automatic Spring-Controlled Lift-Valve, of which the following is a specification.

The present invention relates to spring controlled lift valves in which the valve is raised bodily from its seat so that when raised it is always in a plane parallel to the plane of the seat.

The object of the present invention is to provide a durable construction of valve of this type which shall not require great force to operate it.

For this purpose the present invention consists in arranging two or more flat spiral springs, having a plurality of turns, to act on the valve, these springs being fixed at their inner ends to suitable axes while the springs themselves lie in a plane at right angles to the plane of the valve. A suitable stop for the valve is provided so as to limit its lift.

The invention is illustrated in the accompanying drawings, in which—

Figure 1:
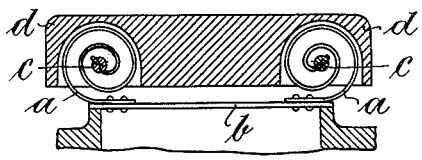
Figure 2:
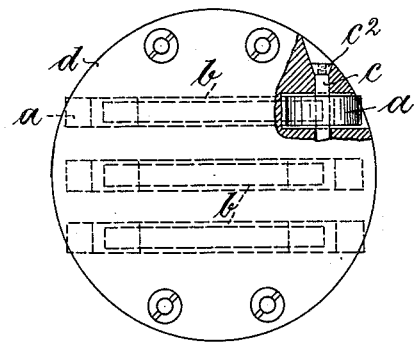
Figure 5:
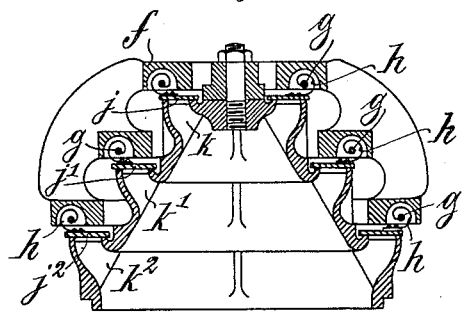
Figure 3:
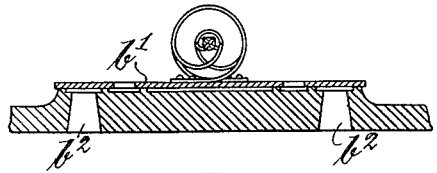
Figure 6:
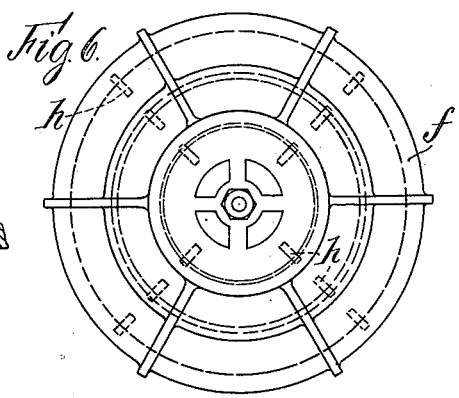
Figure 4:
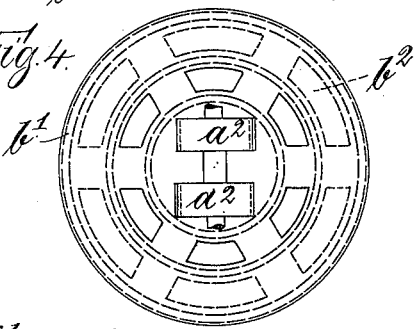

Figure 1 is a section and Fig. 2 a plan of one convenient form, Fig. 3 is a section and Fig. 4 a plan of a modified form showing another arrangement of the springs, Fig. 5 is a section and Fig. 6 is a plan of a further modification showing a form of valve composed of several annular parts arranged in different planes.

In carrying the invention into effect according to the form shown the spiral spring $a$ is fixed at its inner end to a cross bolt $c$ carried by the hood or the like $d$ which also forms the stop for the lift valve. The outer end of the spiral spring $c$ is fixed to the valve $b$. It will be seen that the spiral spring has a plurality of turns and in this way the action of the spring is exceedingly regular and the spring is not too severely strained. Two such springs as shown are provided one at the left and one at the right hand of the valve $b$, so that when the valve $b$ is raised its position is always parallel to the seat. The bolts $c$, to which the spiral springs $a$ are fixed, are held in the cover $d$ by means of conical nuts $c^2$ and the cover $d$ itself is suitably supported by means of bolts $e$. It will be understood that by turning the bolts or rods $c$ the tension of the springs may be adjusted. The rods $c$ turned in this way are then held in their position by means of the nuts $c^2$.

From Figs. 1 and 2 it will be seen that the valve plate is tangential to the spiral and when the valve rises from its seat it moves toward the inner axis of the spiral—in this way the force exerted by the plate on the springs is compressional. The flat spiral springs are fixed at various points to the valve so that the valve is supported horizontally and no guiding means for the valve are necessary. According to Figs. 3 and 4 the continued tangent leaving the spiral $a^2$ does not pass through the center of the valve plate but the spirals $a^2$ are fixed to the plate in the reverse manner. The valve plate $b'$ in this form is still tangential to the flat spiral springs and is illustrated as consisting of a circular valve controlling a number of ports $b^2$.

If desired the valve may be arranged in tiers as shown in Figs. 5 and 6. The cover $f$ is provided and arranged in three tiers. In each tier there are supported bolts $g$ to which spiral springs $h$ are fixed. These spiral springs are fixed in the same way as illustrated in Fig. 1 to annular valves $j$ $j'$ and $j^2$ which control the opening of ports $k$, $k'$ and $k^2$. The operation of each of the valves $j, j'$ and $j^2$ is just the same as has already been described with reference to Fig. 1.

I claim:—

1. A lift valve comprising in combination with a valve seat, a valve plate, a plurality of flat spiral springs of a plurality of turns fixed at their outer ends to said plate and supporting it from a number of points so distributed that said valve plate moves parallel to its seat and bolts to which the inner end of said springs are fixed.

2. A lift valve comprising in combination with a valve seat, a valve plate, a plurality of flat spiral springs of a plurality of turns fixed at their outer ends to different points around the valve plate, said plate being tangential to the spirals and disposed so that when it rises from its seat it approaches the axes of the flat spirals and bolts to which said springs are fixed at their outer ends.

3. A lift valve comprising a valve plate, a plurality of flat spiral springs having several turns, said springs being fixed at their outer ends to different points around said plate to support the same horizontally and arranged in planes at right angles to said plate, bolts arranged axially to said springs and to which said springs are fixed at their inner ends and means for adjusting the tension on said spiral springs.

4. A lift valve comprising a valve plate, a plurality of flat spiral springs having several turns, said springs being fixed at their outer ends to different points around said plate to support the same horizontally and arranged in planes at right angles to said plate, bolts arranged axially to said springs and to which said springs are fixed at their inner ends, means for adjusting the tension on said spiral springs and a cover carrying said bolts to which the spiral springs are fixed and acting as a stop to limit the lift of the valve.

In witness whereof I have hereunto set my hand in the presence of two witnesses.

ADOLF BECK.

Witnesses:
ERNEST ENTENMANN,
CARL WÖRZ.